United States Patent
Wang

(10) Patent No.: US 10,416,441 B2
(45) Date of Patent: Sep. 17, 2019

(54) FLUORESCENT COLOR WHEEL AND PROJECTOR

(71) Applicants: BOE Technology Group Co., Ltd., Beijing (CN); Hefei Xinsheng Optoelectronics Technology Co., Ltd., Anhui (CN)

(72) Inventor: Xudong Wang, Beijing (CN)

(73) Assignees: TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/679,770

(22) Filed: Aug. 17, 2017

(65) Prior Publication Data

US 2018/0074310 A1 Mar. 15, 2018

(30) Foreign Application Priority Data

Sep. 9, 2016 (CN) .......................... 2016 1 0814033

(51) Int. Cl.
| | |
|---|---|
| *G02B 5/08* | (2006.01) |
| *G02B 7/00* | (2006.01) |
| *G02B 26/00* | (2006.01) |
| *G03B 21/20* | (2006.01) |
| *H04N 9/31* | (2006.01) |
| *G03B 33/08* | (2006.01) |

(Continued)

(52) U.S. Cl.
CPC ......... *G02B 26/008* (2013.01); *G02B 5/0808* (2013.01); *G03B 21/204* (2013.01); *G03B 33/08* (2013.01); *H04N 9/3114* (2013.01); *H04N 9/3158* (2013.01); *G02B 7/00* (2013.01); *G03B 21/008* (2013.01); *G03B 21/2066* (2013.01); *G03B 21/28* (2013.01)

(58) Field of Classification Search
CPC ..... F21V 7/04; F21V 1/00; F21V 5/00; F21V 7/00; F21V 11/00
USPC ......... 362/614, 611, 217.08, 235, 84, 235.84
See application file for complete search history.

(56) References Cited

U.S. PATENT DOCUMENTS

| | | | |
|---|---|---|---|
| 9,644,803 B2 | 5/2017 | Kasugai et al. | |
| 2003/0099108 A1* | 5/2003 | Slobodin | G02B 26/008 362/293 |
| 2007/0019408 A1* | 1/2007 | McGuire, Jr. | F21S 10/007 362/231 |

(Continued)

FOREIGN PATENT DOCUMENTS

| | | |
|---|---|---|
| CN | 101221346 A | 7/2008 |
| CN | 104880896 A | 9/2015 |

(Continued)

OTHER PUBLICATIONS

First Office Action from Chinese Patent Application No. 201610814033.9, dated Aug. 21, 2017, 10 pages.

*Primary Examiner* — Edwyn Labaze
(74) *Attorney, Agent, or Firm* — Westman, Champlin & Koehler, P.A.

(57) ABSTRACT

Disclosed are a fluorescent color wheel and a projector. The fluorescent color wheel includes a substrate; and a light converting part, a light transmitting part, and a light absorbing part, which are provided on one side of the substrate and arranged along the circumference of the substrate, wherein the light emitted from the light converting part can exit from said side of the substrate.

15 Claims, 3 Drawing Sheets

(51) Int. Cl.
*G03B 21/00* (2006.01)
*G03B 21/28* (2006.01)

(56) References Cited

U.S. PATENT DOCUMENTS

| | | | | |
|---|---|---|---|---|
| 2008/0018983 A1* | 1/2008 | Ishii | ................... | G02B 26/0841 359/290 |
| 2009/0103053 A1* | 4/2009 | Ichikawa | ............. | H04N 5/7458 353/33 |
| 2012/0133846 A1* | 5/2012 | Ishii | .................... | H04N 9/3114 348/744 |
| 2012/0201030 A1* | 8/2012 | Yuan | .................... | G02B 26/008 362/293 |
| 2013/0250546 A1* | 9/2013 | Hu | ........................... | F21V 9/40 362/84 |
| 2014/0240676 A1* | 8/2014 | Maes | .................... | G03B 21/204 353/20 |
| 2014/0268066 A1* | 9/2014 | Guthrie | .................... | F21V 9/40 353/31 |
| 2015/0109773 A1* | 4/2015 | Li | ........................... | F21V 5/007 362/231 |
| 2015/0226389 A1* | 8/2015 | Kasugai | ............... | G02B 26/008 353/31 |
| 2016/0041457 A1 | 2/2016 | Oh et al. | | |
| 2016/0316183 A1* | 10/2016 | Cui | .................... | H04N 9/3114 |
| 2017/0051885 A1* | 2/2017 | Hirasawa | .................. | F21K 9/64 |
| 2018/0239233 A1* | 8/2018 | Kado | .................... | G03B 21/14 |

FOREIGN PATENT DOCUMENTS

| | | |
|---|---|---|
| CN | 205982971 U | 2/2017 |
| WO | 2014073136 A1 | 5/2014 |

* cited by examiner

FLUORESCENT COLOR WHEEL AND PROJECTOR

CROSS REFERENCE

This disclosure claims priority benefits from Chinese Patent Application No. 201610814033.9 filed on Sep. 9, 2016, entitled "Fluorescent Color Wheel and Projector", which is incorporated by reference herein in its entirety.

TECHNICAL FIELD

This disclosure relates to a fluorescent color wheel and a projector.

BACKGROUND

Among a variety of light sources, fluorescent light sources can achieve high-density light emission by increasing the energy density of excitation light irradiating a fluorescent substance or improving the output of excitation light. In projection display products, fluorescent light emission is also applied.

In the related art, the "ghosting" phenomenon is prone to occur in projection display products. The "ghosting" phenomenon is mainly caused by two reasons. One reason is that the response of liquid crystal takes some time and the intermediate state of liquid crystal molecules is present when a previous image is converted to a next image, and this intermediate state may result in blur of images; the other reason is that there is an effect of persistence of vision for human eye (an image staying on the retina of the human eye is 10-12 ms), and thus overlapping occurs between a first image and a second image, which results in blur of images.

If a digital micromirror device (DMD) chip having a relatively high response speed is used, the occurrence of the "ghosting" phenomenon caused by the response time of pixels is ameliorate, but the "ghosting" phenomenon caused by persistence of vision in human eye still exists.

SUMMARY

One object of this disclosure is to provide a fluorescent color wheel.

A first aspect of this disclosure provides a fluorescent color wheel. The fluorescent color wheel comprises:
a substrate, and
a light converting part, a light transmitting part, and a light absorbing part, wherein the light converting part, the light transmitting part, and the light absorbing part are provided on one side of the substrate and arranged along the circumference of the substrate, wherein the light emitted from the light converting part can exit from said side of the substrate.

In one embodiment, the area of the light converting part is greater than that of the light transmitting part, and the area of the light transmitting part is greater than that of the light absorbing part.

In one embodiment, the light converting part comprises a fluorescent substance emitting yellow light.

In one embodiment, the light converting part comprises at least one material selected from the group consisting of silicates, aluminates, oxynitrides, nitrides, tungstates, molybdates, and oxysulfides.

Another object of this disclosure is to provide a projector.

A second aspect of this disclosure provides a projector. The projector comprises:

a light source;
the fluorescent color wheel as described above;
a dichroic mirror comprising a first surface and a second surface opposite to the first surface, the dichroic mirror being configured to reflect the light, which is from the light source and incident on the first surface, and to transmit the light converted by the light converting part of the fluorescent color wheel, wherein the light, which is from the light source and incident on the first surface, is reflected to the fluorescent color wheel, and the light converted by the light converting part of the fluorescent color wheel passes through the dichroic mirror via the first surface and exits from the second surface;
a light directing unit configured to direct the light transmitted through the light transmitting part of the fluorescent color wheel to the second surface of the dichroic mirror, wherein the light directed by the light directing unit is then reflected by the dichroic mirror to exit the second surface;
a light modulating unit configured to receive and modulate the light from the second surface of the dichroic mirror;
an image generating unit configured to generate an image from the light modulated by the light modulating unit; and
a light projecting unit configured to project the image.

In one embodiment, the light modulating unit comprises a color filter unit, configured to modulate light to have a selected color.

In one embodiment, the color filter unit comprises a color filter wheel, which comprises a first filter region, a second filter region, and a maintaining region, wherein
the first filter region is configured to modulate light to have a first color;
the second filter region is configured to modulate light to have a second color;
the maintaining region is configured to maintain the color of light unchanged.

In one embodiment, the first filter region and the second filter region of the color filter wheel correspond to the light converting part of the fluorescent color wheel, and the maintaining region of the color filter wheel corresponds to the light transmitting part and the light absorbing part of the fluorescent color wheel.

In one embodiment, the light emitted from the light source is blue light;
the first color is red;
the second color is green; and
the maintaining region is a transparent region.

In one embodiment, the ratio of the area of the first filter region to the area of the second filter region is less than 1, and the ratio of the area of the first filter region to the area of the maintaining region is less than 1.

In one embodiment, the ratio of the area of the second filter region to the area of the maintaining region is equal to 1.

In one embodiment, the light modulating unit further comprises a light homogenizing unit, which is configured to modulate the light passed through the light homogenizing unit such that the modulated light has a uniform intensity in a direction perpendicular to the central optical axis.

In one embodiment, the light homogenizing unit comprises a honeycomb lens or a light homogenizing rod.

In one embodiment, the light directing unit comprises a plurality of reflection mirrors.

In one embodiment, the image generating unit comprises a digital micromirror device chip.

DESCRIPTION OF DRAWINGS

In order to illustrate the technical solutions in embodiments of this disclosure more clearly, accompanying drawings of embodiments will be simply illustrated below. It is to be understood that the accompanying drawings described below are merely some embodiments related to this invention but not limitations of the invention, in which.

DESCRIPTION OF EMBODIMENTS

In order to enable objects, technical solutions, and advantages of this disclosure to be clearer, technical solutions of embodiments of this disclosure will be described in details below in conjunction with the accompanying drawings. Obviously, the embodiments described are a part of the embodiments of this disclosure, rather than all of the embodiments. Based on the embodiments of this disclosure described, all other embodiments obtained by the person skilled in the art without performing inventive work also belong to the scope protected by this disclosure.

When an element or its embodiment of this disclosure is described, the articles "a", "an", "the", and "said" are intended to indicate that there are one or more elements. The terms "comprise", "include", "contain", and "have" are intended to be inclusive and indicate that there may be additional elements other than the elements listed.

The terms "on", "on the top of", "located on", and "located on the top of" mean that there is a first element such as a first structure present on a second element such as a second structure, wherein there may be an intermediate element such as an interface structure between the first element and the second element. The term "contact" means that a first element such as a first structure and a second element such as a second structure are connected and there may be or not be other elements at the interface of the two elements.

Figure 1:
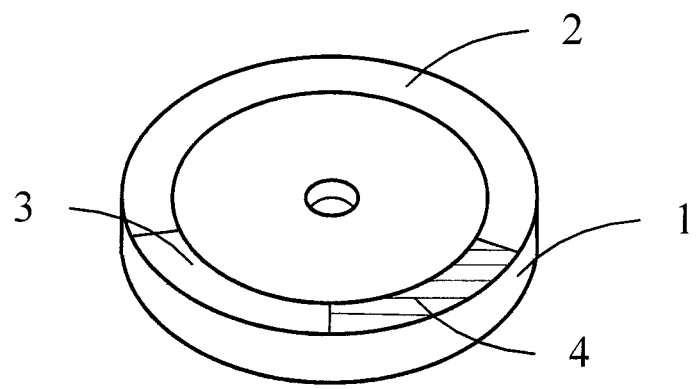
FIG. 1 is a schematic diagram of a fluorescent color wheel in an embodiment of this disclosure.

FIG. 1 is a schematic diagram of a fluorescent color wheel in an embodiment of this disclosure. As shown in FIG. 1, the fluorescent color wheel comprises a substrate 1, a light converting part 2, a light transmitting part 3, and a light absorbing part 4. The light converting part 2, the light transmitting part 3, and the light absorbing part 4 are provided on one side of the substrate 1 and arranged along the circumference of the substrate. It can be understood that the fluorescence emitted by the light converting part 2 can exit from the side of the substrate provided with the light converting part 2.

The term "fluorescent color wheel" herein does not limit the shape of the fluorescent color wheel merely to a circular shape, and other suitable shapes may also be included.

The substrate may be any appropriate material. For example, as a reflection type substrate, an aluminum material may be used to manufacture the substrate; and as a transmission type substrate, a light-transmitting material, for example glass, may be used to manufacture the substrate.

Figure 2:
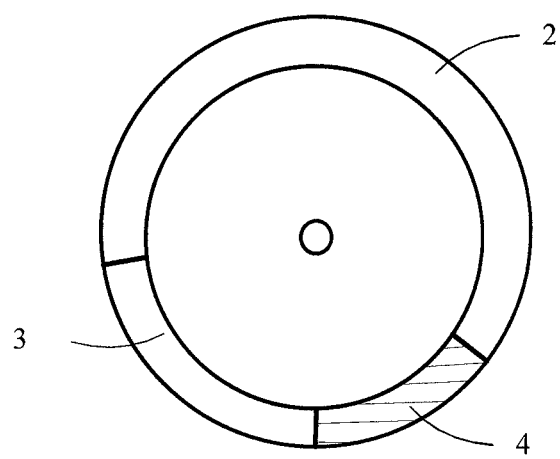
FIG. 2 is a top view of a fluorescent color wheel in an embodiment of this disclosure.

FIG. 2 is a top view of a fluorescent color wheel in an embodiment of this disclosure. In one embodiment, the area of the light converting part 2 is greater than that of the light transmitting part 3, and the area of the light transmitting part 3 is greater than that of the light absorbing part 4. For example, the area ratio of the light converting part 2, the light transmitting part 3, and the light absorbing part 4 may be 1.5:1:0.5. However, the area ratio of the light converting part, the light transmitting part, and the light absorbing part is not limited to that described above, and the area ratio of the light converting part, the light transmitting part, and the light absorbing part may be set according to practical needs.

In one embodiment, the light converting part comprises a fluorescent substance emitting yellow light. In this case, the light converting part of the fluorescent color wheel can emit yellow light. The fluorescent substance emitting yellow light may include but is not limited to yttrium aluminum garnet (YAG), which has a chemical formula of $Y_3Al_5O_{12}$.

The color of the excitation light emitted by the light converting part is not limited to yellow, and other desired colors may also be included. In one embodiment, the light converting part comprises at least one material selected from the group consisting of silicates, aluminates, oxynitrides, nitrides, tungstates, molybdates, and oxysulfides.

The light transmitting part may be produced from a transparent material, or may be produced from any other material which has the capability of transmitting the light which is incident thereon. In one embodiment, the light transmitting part may be transparent glass; in another embodiment, the light transmitting part may be transparent plastic, and for example, one produced from a transparent epoxy resin material.

The light absorbing part may be produced from a material capable of absorbing the light which is incident thereon. In some specific embodiments, the light absorbing part may be produced from a black material, for example carbon black, iron black, etc.

Figure 3:
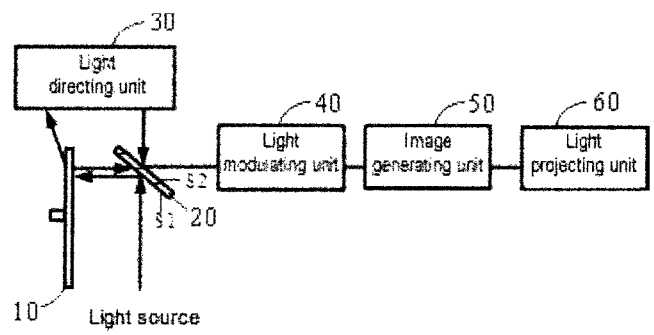
FIG. 3 is a schematic diagram of a projector in an embodiment of this disclosure.

FIG. 3 is a schematic diagram of a projector in an embodiment of this disclosure. As shown in FIG. 3, the projector comprises a fluorescent color wheel 10, a dichroic mirror 20, a light directing unit 30, a light modulating unit 40, an image generating unit 50, and a light projecting unit 60. The fluorescent color wheel 10 is the fluorescent color wheel as described above. The dichroic mirror 20 has a first surface S1 and a second surface S2 opposite to the first surface S1. The dichroic mirror 20 reflects the light, which is from the light source and incident on the first surface S1, to the fluorescent color wheel 10, wherein the light converted by the light converting part of the fluorescent color wheel 10 passes through the dichroic mirror 20 via the first surface S1 and exits from the second surface S2. The light directing unit 30 directs the light transmitted through the light transmitting part of the fluorescent color wheel 10 to the second surface S2 of the dichroic mirror 20, wherein the light directed by the light directing unit 30 is then reflected by the dichroic mirror 20 to exit the second surface S2. The light modulating unit 40 receives and modulates the light from the second surface S2 of the dichroic mirror 20. The image generating unit 50 generates an image from the light modulated by the light modulating unit 40. The light projecting unit 60 projects the image generated by the image generating unit 50.

In one embodiment, the light modulating unit may comprise a color filter unit, which modulates the light passed through the color filter unit into the light having a selected color. The color filter unit may be a color filter wheel.

Figure 4:
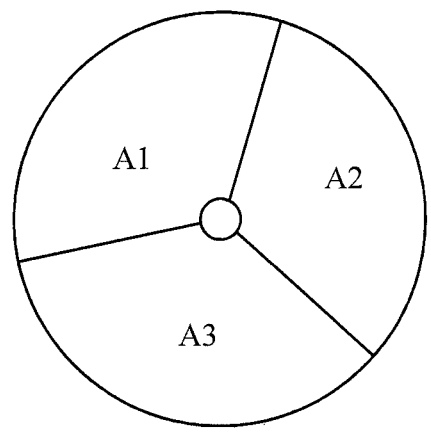
FIG. 4 is a schematic diagram of a color filter wheel in an embodiment of this disclosure.

FIG. 4 is a schematic diagram of a color filter wheel in an embodiment of this disclosure. As shown in FIG. 4, the color filter wheel has a first filter region A1, a second filter region A2, and a maintaining region A3. The first filter region A1 modulates the light passed through the first filter region A1 into the light having a first color; the second filter region A2 modulates the light passed through the second filter region A2 into the light having a second color; and the maintaining region A3 maintains the color of the light passed through the maintaining region A3 unchanged.

The first filter region A1 and the second filter region A2 of the color filter wheel correspond to the light converting part of the fluorescent color wheel. The maintaining region A3 of the color filter wheel corresponds to the light transmitting part and the light absorbing part of the fluorescent color wheel.

In one embodiment, the light emitted from the light source of the projector is blue light. In this case, the first color may be red, and the second color may be green. For example, the first filter region A1 may be configured to be a red filter region, and the second filter region A2 may be configured to be a green filter region.

The area ratio of respective regions of the fluorescent color wheel and the area ratio of respective regions of the color filter wheel may be set according to respective times for displaying a red image, a green image, and a blue image and according to the addressing time and the pixel response time. In one embodiment, the color filter wheel may be configured such that the ratio of the area of the first filter region to the area of the second filter region is less than 1, and the ratio of the area of the first filter region to the area of the maintaining region is less than 1. Furthermore, the color filter wheel may be configured such that the ratio of the area of the second filter region to the area of the maintaining region is equal to 1.

The light modulating unit may also comprise a light homogenizing unit. The light homogenizing unit modulates the light passed through the light homogenizing unit such that the modulated light has a uniform intensity in a direction perpendicular to the central optical axis. The light homogenizing unit may comprise a honeycomb lens or a light homogenizing rod.

Examples of the image generating unit include but not limited to a digital micromirror device (DMD) chip.

Figure 5:
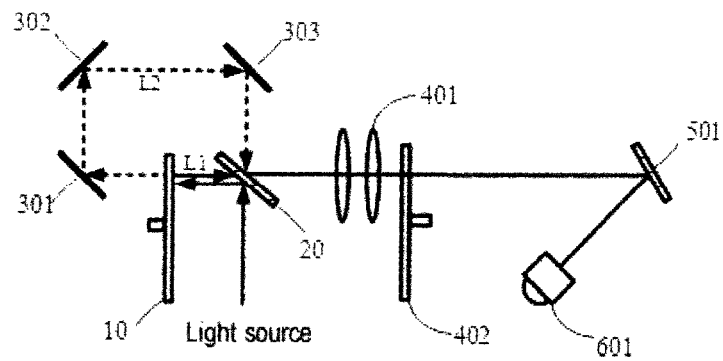
FIG. 5 is a schematic diagram of light paths of a projector in an embodiment of this disclosure.

FIG. 5 is a schematic diagram of light paths of a projector in an embodiment of this disclosure. In the embodiment shown in FIG. 5, the following structure is exemplified. Light directing unit comprises three reflection mirrors, which are a reflection mirror 301, a reflection mirror 302, a reflection mirror 303, and light modulating unit comprises a light homogenizing unit 401 and a color filter wheel 402. Image generating unit comprises a digital micromirror device (DMD) chip 501, and light projecting unit comprises a projecting lens 601. Thus, the projector comprises a fluorescent color wheel 10, a dichroic mirror 20, a reflection mirror 301, a reflection mirror 302, a reflection mirror 303, a light homogenizing unit 401, a color filter wheel 402, a DMD chip 501, and a projecting lens 601, as shown in FIG. 5.

By taking an example wherein the light emitted from the light source is blue light, light paths as shown in FIG. 5 are described. The blue light emitted from the light source is incident onto first surface S1 of the dichroic mirror 20. The dichroic mirror 20 has properties capable of highly reflecting blue light and highly transmitting yellow light. Therefore, dichroic mirror 20 can reflect the blue light, which is emitted from the light source and incident on the first surface S1 of the dichroic mirror, to the fluorescent color wheel 10.

(1) Light Path 1

When the fluorescent color wheel 10 is rotated to the light converting part, i.e., when the blue light reflected from the dichroic mirror 20 is incident onto the light converting part of the fluorescent color wheel 10 (corresponding time periods are a first time period t1 and a second time period t2), the light converting part of the fluorescent color wheel 10 converts the incident blue light to yellow light which exits from the side of the fluorescent color wheel 10 provided with the light converting part (see L1 in FIG. 5). Since the dichroic mirror has high transmittance for yellow light, the yellow light emitted from the fluorescent color wheel 10 (L1) and incident onto the first surface S1 of the dichroic mirror 20 can pass through the first surface and be transmitted by the dichroic mirror 20.

The yellow light transmitted through the dichroic mirror 20 exits from second surface S2 of the dichroic mirror 20, and then passes through the light homogenizing unit 401 so as to be modulated into light having a uniform intensity in a direction perpendicular to the central optical axis. The light from the light homogenizing unit 401 is incident onto the color filter wheel 402.

When the color filter wheel 402 is rotated to the first filter region A1 such as a red filter region, the light from the light homogenizing unit 401 is modulated by the first filter region to become a red light. The red light, which is generated by being modulated by the first filter region of the color filter wheel 402, is incident onto the DMD chip 501 so as to form a red image (the corresponding time period is a first time period t1).

When the color filter wheel 402 is rotated to the second filter region A2 such as a green filter region, the light from the light homogenizing unit 401 is modulated by the second filter region to become a green light. The green light, which is generated by being modulated by the second filter region of the color filter wheel 402, is incident onto the DMD chip 501 so as to form a green image (the corresponding time period is a second time period t2).

The DMD chip 501 transfers the generated image to the projecting lens 601. The projecting lens 601 projects the image onto a screen.

(2) Light Path 2

When the fluorescent color wheel 10 is rotated to the light transmitting part, i.e., when the blue light reflected from the dichroic mirror 20 is incident onto the light transmitting part of the fluorescent color wheel 10 (the corresponding time period is a third time period t3), the light transmitting part of the fluorescent color wheel 10 transmits the blue light from the dichroic mirror. The blue light transmitted by the light transmitting part of the fluorescent color wheel 10 is reflected by the reflection mirror 301, the reflection mirror 302, and the reflection mirror 303 and is incident onto the second surface S2 of the dichroic mirror 20 (see L2 in FIG. 5).

The blue light from the reflection mirror 303 is then reflected by the dichroic mirror 20 to exit the second surface S2 of the dichroic mirror. The blue light reflected by the dichroic mirror 20 passes through the light homogenizing unit 401 and is modulated into the light having a uniform intensity in a direction perpendicular to the central optical axis. The light from the light homogenizing unit 401 is incident onto the color filter wheel 402.

At this time, the color filter wheel 402 is rotated to the maintaining region A3 (a transparent region), and the blue light from the light homogenizing unit 401 is still blue light after passing through the color filter wheel 402. The blue light passed through the maintaining region of the color filter wheel is incident onto the DMD chip 501 so as to form a blue image (the corresponding time period is a third time period t3).

A red image, a green image, and a blue image are formed in a first time period t1, a second time period t2, and a third time period t3 respectively, and thus the display of a complete image is achieved. The total time of the first time period t1, the second time period t2, and the third time period t3 may be less than 100 ms.

(3) Light Path 3

When the fluorescent color wheel 10 is rotated to the light absorbing part, i.e., when the blue light reflected from the dichroic mirror 20 is incident onto the light absorbing part of the fluorescent color wheel 10 (the corresponding time period is a fourth time period t4), the light absorbing part of the fluorescent color wheel 10 absorbs the incident blue light, and therefore no light is reflected or transmitted from the fluorescent color wheel 10. Thus, no light is incident onto the DMD chip 501. At this time, a black image is formed on the DMD chip 501. The time period t4, during which the black image is formed, may correspond to the pixel response time $t_r$.

A dichroic layer of the dichroic mirror may be located at any position between the first surface S1 and the second surface S2, and is not limited in this disclosure.

Figure 6:
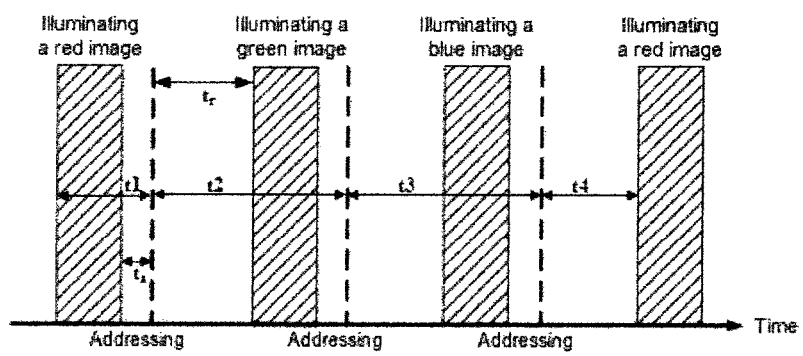
FIG. 6 is a schematic diagram of the process of display in an embodiment of this disclosure.

FIG. 6 is a schematic diagram of the process of display in an embodiment of this disclosure. In FIG. 6, $t_r$ represents the pixel response time of the DMD chip, and $t_a$ represents the addressing time of the DMD chip. As shown in FIG. 6, in the first time period t1, the image generating unit such as a DMD chip is irradiated by red light to display a red image; in the second time period t2, the image generating unit such as the DMD chip is irradiated by green light to display a green image; and in the third time period t3, the image generating unit such as the DMD chip is irradiated by blue light to display a blue image. The red image, the green image, and the blue image formed in the first time period t1, the second time period t2, and the third time period t3 respectively, can form a complete image. As seen from FIG. 6, during the fourth time period t4, the image generating unit such as the DMD chip may display a black image, so that a black image is inserted between two images displayed. Since the persistence of vision of a previous image formed in the human eye will be "cut off" by the black image, the overlapping between a previous image and a next image will not occur. Therefore, the "ghosting" phenomenon is avoided, and thus blur of images will not be caused.

It should be noted that the display order of a red image, a green image, and a blue image is merely exemplary, and is not limited to the display order as shown in FIG. 6. Similarly, the "black insertion" between a blue image and a red image is also exemplary.

The fluorescent color wheel and the projector provided in embodiments of this disclosure can solve the "ghosting" phenomenon which is the overlapping of images occurring in dynamic images. By configuring the fluorescent color wheel such that the light converting part, the light transmitting part, and the light absorbing part are provided on one side of the substrate and arranged along the circumference of the substrate, and the light emitted from the light converting part exit from said side of the substrate, a novel "black insertion" solution is provided. Since a black image may be inserted between two frames of images, the "ghosting" phenomenon caused by overlapping of two images due to persistence of vision of the human eye is avoided.

Some specific embodiments have been described above, and these embodiments are merely shown by way of example but are not intended to limit the scope of this invention. In fact, embodiments described herein may be implemented in various other forms. Furthermore, various omissions, replacements, and modifications may be made to the forms of embodiments described herein, without departing from the spirit of this invention. Appended claims and equivalents thereof are intended to encompass such forms or modifications which fall in the scope and the spirit of this invention.

What is claimed is:

1. A fluorescent color wheel, comprising:
   a substrate, and
   a light converting part, a light transmitting part, and a light absorbing part which absorbs the light incident onto the light absorbing part such that no light is reflected or transmitted therefrom, wherein the light converting part, the light transmitting part, and the light absorbing part are provided on one side of the substrate and arranged along the circumference of the substrate, and wherein the light emitted from the light converting part can exit from said side of the substrate.

2. The fluorescent color wheel according to claim 1, wherein the area of the light converting part is greater than that of the light transmitting part, and the area of the light transmitting part is greater than that of the light absorbing part.

3. The fluorescent color wheel according to claim 1, wherein the light converting part comprises a fluorescent substance emitting yellow light.

4. The fluorescent color wheel according to claim 1, wherein the light converting part comprises at least one material selected from the group consisting of silicates, aluminates, oxynitrides, nitrides, tungstates, molybdates, and oxysulfides.

5. A projector, comprising:
   a light source;
   a fluorescent color wheel comprising a substrate, and a light converting part, a light transmitting part, and a light absorbing part which absorbs the light incident onto the light absorbing part such that no light is reflected or transmitted therefrom, wherein the light converting part, the light transmitting part, and the light absorbing part are provided on one side of the substrate and arranged along the circumference of the substrate, and wherein the light emitted from the light converting part can exit from said side of the substrate;
   a dichroic mirror comprising a first surface and a second surface opposite to the first surface, the dichroic mirror being configured to reflect the light, which is from the light source and incident on the first surface, and to transmit the light converted by the light converting part of the fluorescent color wheel, wherein the light, which is from the light source and incident on the first surface, is reflected to the fluorescent color wheel, and the light converted by the light converting part of the fluorescent color wheel passes through the dichroic mirror via the first surface and exits from the second surface;
   a light directing unit configured to direct the light transmitted through the light transmitting part of the fluorescent color wheel to the second surface of the dichroic mirror, wherein the light directed by the light directing unit is then reflected by the dichroic mirror to exit the second surface;
   a light modulating unit configured to receive and modulate the light from the second surface of the dichroic mirror;
   an image generating unit configured to generate an image from the light modulated by the light modulating unit; and
   a light projecting unit configured to project the image.

6. The projector according to claim 5, wherein the light modulating unit comprises a color filter unit, configured to modulate light to have a selected color.

7. The projector according to claim 6, wherein the color filter unit comprises a color filter wheel, said color filter wheel comprising a first filter region, a second filter region, and a maintaining region, wherein
the first filter region is configured to modulate light to have a first color;
the second filter region is configured to modulate light to have a second color;
the maintaining region is configured to maintain the color of light unchanged.

8. The projector according to claim 7, wherein the first filter region and the second filter region of the color filter wheel correspond to the light converting part of the fluorescent color wheel, and the maintaining region of the color filter wheel corresponds to the light transmitting part and the light absorbing part of the fluorescent color wheel.

9. The projector according to claim 7, wherein the light emitted from the light source is blue light;
the first color is red;
the second color is green; and
the maintaining region is a transparent region.

10. The projector according to claim 9, wherein the ratio of the area of the first filter region to the area of the second filter region is less than 1, and the ratio of the area of the first filter region to the area of the maintaining region is less than 1.

11. The projector according to claim 10, wherein the ratio of the area of the second filter region to the area of the maintaining region is equal to 1.

12. The projector according to claim 6, wherein the light modulating unit further comprises a light homogenizing unit, which is configured to modulate the light passed through the light homogenizing unit such that the modulated light has a uniform intensity in a direction perpendicular to the central optical axis.

13. The projector according to claim 12, wherein the light homogenizing unit comprises a honeycomb lens or a light homogenizing rod.

14. The projector according to claim 5, wherein the light directing unit comprises a plurality of reflection mirrors.

15. The projector according to claim 5, wherein the image generating unit comprises a digital micromirror device chip.

* * * * *